US005811708A

United States Patent [19]

Matsumoto

[11] Patent Number: 5,811,708

[45] Date of Patent: Sep. 22, 1998

[54] KARAOKE APPARATUS WITH TUNING SUB VOCAL ASIDE MAIN VOCAL

[75] Inventor: Shuichi Matsumoto, Hamamatsu, Japan

[73] Assignee: Yamaha Corporation, Hamamatsu, Japan

[21] Appl. No.: 974,294

[22] Filed: Nov. 19, 1997

[30] Foreign Application Priority Data

Nov. 20, 1996 [JP] Japan .................................... 8-309348

[51] Int. Cl.[6] ............................... G09B 5/00; G10H 1/10; G10H 1/26

[52] U.S. Cl. ............................ 84/610; 84/631; 84/DIG. 4

[58] Field of Search .............................. 84/609–614, 625, 84/631, 634–638, DIG. 4; 434/307 A

[56] References Cited

U.S. PATENT DOCUMENTS 5,477,003 12/1995 Muraki et al. ............................ 84/610
5,686,684 11/1997 Nagata et al. ............................ 84/631
5,719,346 2/1998 Yoshida et al. ........................... 84/631

*Primary Examiner*—Stanley J. Witkowski
*Attorney, Agent, or Firm*—Pillsbury Madison & Sutro LLP

[57] ABSTRACT

A karaoke apparatus is constructed for playing a karaoke song according to song data jointly with a first vocal part and a second vocal part. In the karaoke apparatus, a generator device processes the song data to produce an orchestral accompaniment sound during the course of play of the karaoke song. A first input device collects a first singing voice which is physically sung along the orchestral accompaniment sound to fit with the first vocal part. A second input device collects a second singing voice which is physically sung along the orchestral accompaniment sound to support the first singing voice. An adjuster device adjusts at least a pitch of the second singing voice collected by the second input device according to reference data contained in the song data so as to fit the second singing voice with the second vocal part. A mixer device mixes the first singing voice collected by the first input device and the second singing voice fed from the adjuster device together with the orchestral accompaniment sound to thereby effect play of the karaoke song. The first singing voice may be of a main melody, while the second singing voice may be of a harmony melody or a back chorus.

24 Claims, 8 Drawing Sheets

KARAOKE APPARATUS WITH TUNING SUB VOCAL ASIDE MAIN VOCAL

BACKGROUND OF THE INVENTION

1. Field of the Invention

The present invention relates to a karaoke apparatus that allows a plurality of singers to jointly sing a song with separate vocal parts.

2. Description of Related Art

Along with karaoke popularization, various karaoke performance variations have been emerging. Now, karaoke singers are not satisfied with plain karaoke performance in which only a main melody is simply sung. Some karaoke songs have a harmony melody part as a counter melody in addition to the main melody part. Some karaoke songs make this harmony part open to karaoke singers rather than embedding it in automatic karaoke accompaniment. However, it is difficult to sing a harmony melody in a correct pitch as compared to a main melody. In contrast to the main melody part, the harmony melody part has phrases which are intermittently voiced during karaoke play. It is hard to correctly recognize the beginning and ending of each phrase contained in the harmony melody part. This discourages many karaoke singers from singing the harmony melody.

Further, a karaoke apparatus has been put in practice in which, when a karaoke singer sings a main melody, an inputted singing voice signal is frequency-converted into a voice signal representing a corresponding harmony melody. Namely, when a karaoke singer sings a main vocal part, a corresponding harmony vocal part is automatically generated by the karaoke apparatus. In this karaoke apparatus, however, a plurality of singers cannot sing jointly at a time for the main and harmony parts. Joyful karaoke play with partners cannot be achieved.

SUMMARY OF THE INVENTION

It is therefore an object of the present invention to provide a karaoke apparatus that facilitates singing of sub melody parts other than a main melody part of a karaoke song, thereby allowing a plurality of karaoke singers to enjoy singing together.

According to the present invention, a karaoke apparatus is constructed for playing a karaoke song according to song data jointly with a first vocal part and a second vocal part. In the inventive karaoke apparatus, a generator device processes the song data to produce an orchestral accompaniment sound during the course of play of the karaoke song. A first input device collects a first singing voice which is physically sung along the orchestral accompaniment sound to fit with the first vocal part. A second input device collects a second singing voice which is physically sung along the orchestral accompaniment sound to support the first singing voice. An adjuster device adjusts at least a pitch of the second singing voice collected by the second input device according to reference data contained in the song data so as to fit the second singing voice with the second vocal part. A mixer device mixes the first singing voice collected by the first input device and the second singing voice fed from the adjuster device together with the orchestral accompaniment sound to thereby effect play of the karaoke song.

In one form, the first input device collects the first singing voice which is sung along a main melody allotted to the first vocal part, while the second input device collects the second singing voice which is sung along a harmony melody allotted to the second vocal part and made consonant with the main melody. The adjuster device adjusts the second singing voice according to reference data representative of the harmony melody. Preferably, the adjuster device includes a muting section that mutes the second singing voice when the same is incorrectly sung at a rest event of the harmony melody. Preferably, the adjuster device further comprises a harmony section that operates when the second singing voice is incorrectly not sung to miss note events contained in the harmony melody for modifying the first singing voice according to the reference data to fit with the second vocal part in place of the missing second singing voice.

In another form, the first input device collects the first singing voice which is sung along a solo melody allotted to the first vocal part, while the second input device collects the second singing voice which is sung along a chorus melody allotted to the second vocal part and made to back the solo melody. The adjuster device adjusts the second singing voice according to reference data representative of the chorus melody. Preferably, the adjuster device includes a muting section that mutes the second singing voice when the same is incorrectly sung at a rest event of the chorus melody. Preferably, the generator device includes a chorus section that generates a synthetic singing voice. The mixer device operates when the second singing voice is not sung for selecting the synthetic singing voice to fill the second vocal part in place of the second singing voice, and otherwise operates when the second singing voice is sung for muting the synthetic singing voice. Preferably, the karaoke apparatus further comprises a harmony device that creates a harmony singing voice which is derived from the first singing voice and which is made consonant with the first singing voice.

BRIEF DESCRIPTION OF THE DRAWINGS

The above and other objects, features and advantages of the present invention will be apparent from the following detailed description of preferred embodiments of the invention in conjugation with the accompanying drawings, in which.

DETAILED DESCRIPTION OF PREFERRED EMBODIMENTS

Figure 1:
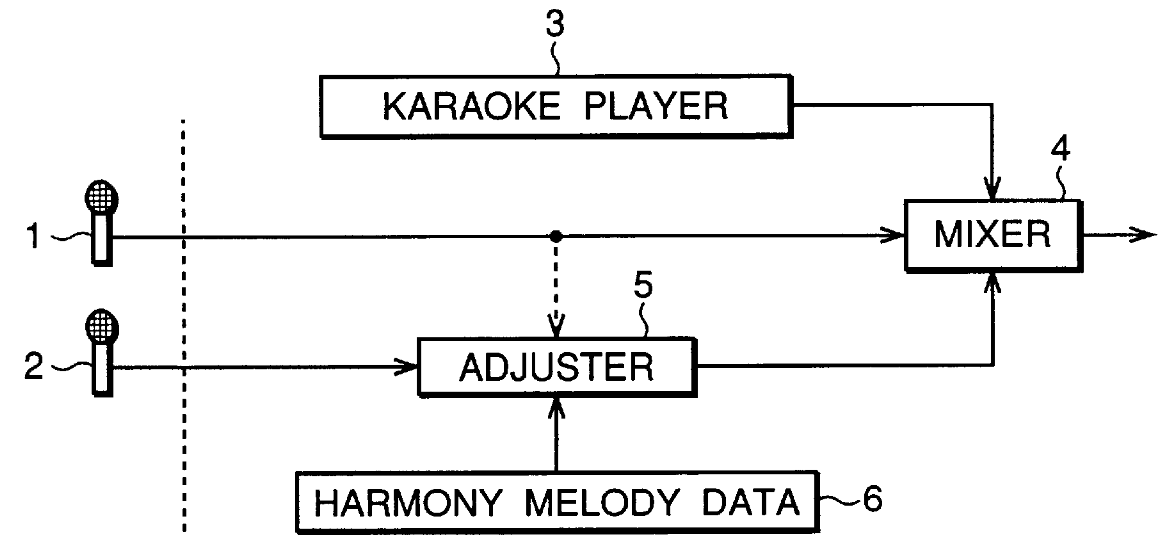
FIG. 1 is a schematic block diagram illustrating a karaoke apparatus practiced as a first preferred embodiment of the present invention.
Figure 2:
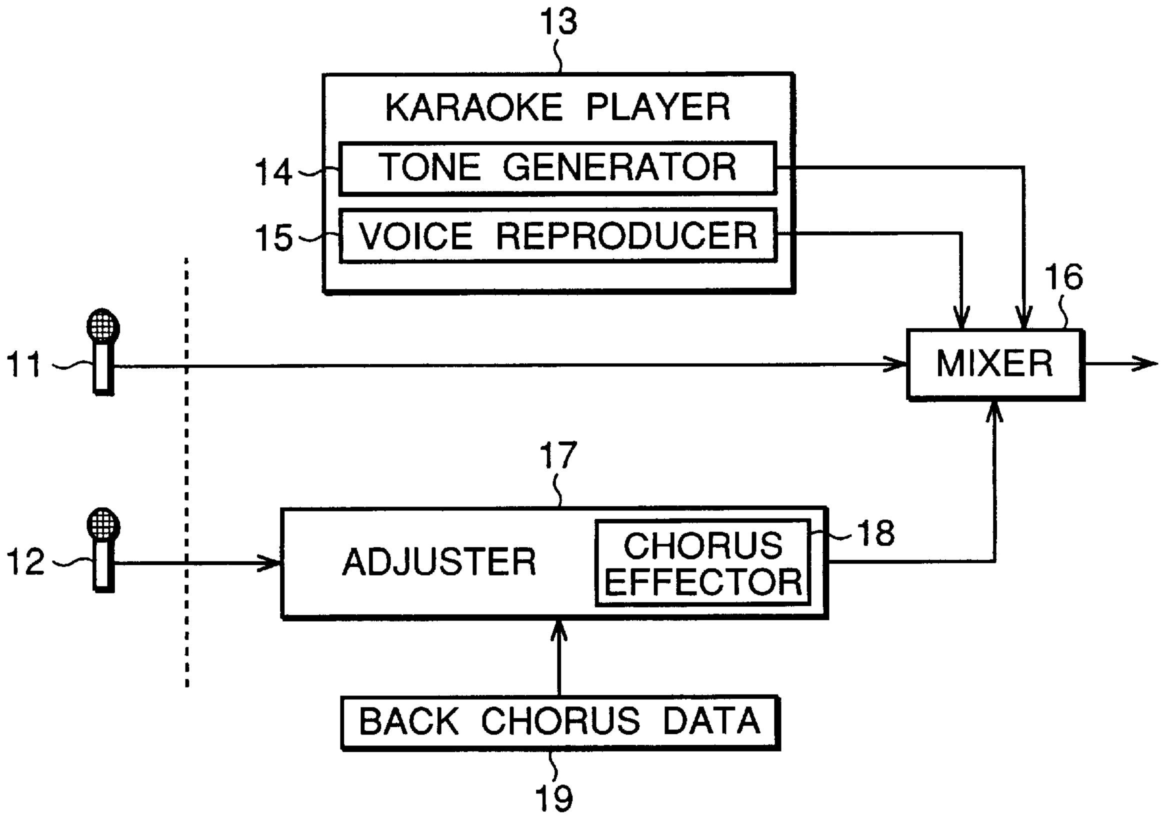
FIG. 2 is a schematic block diagram illustrating a karaoke apparatus practiced as a second preferred embodiment of the present invention.
Figure 3:
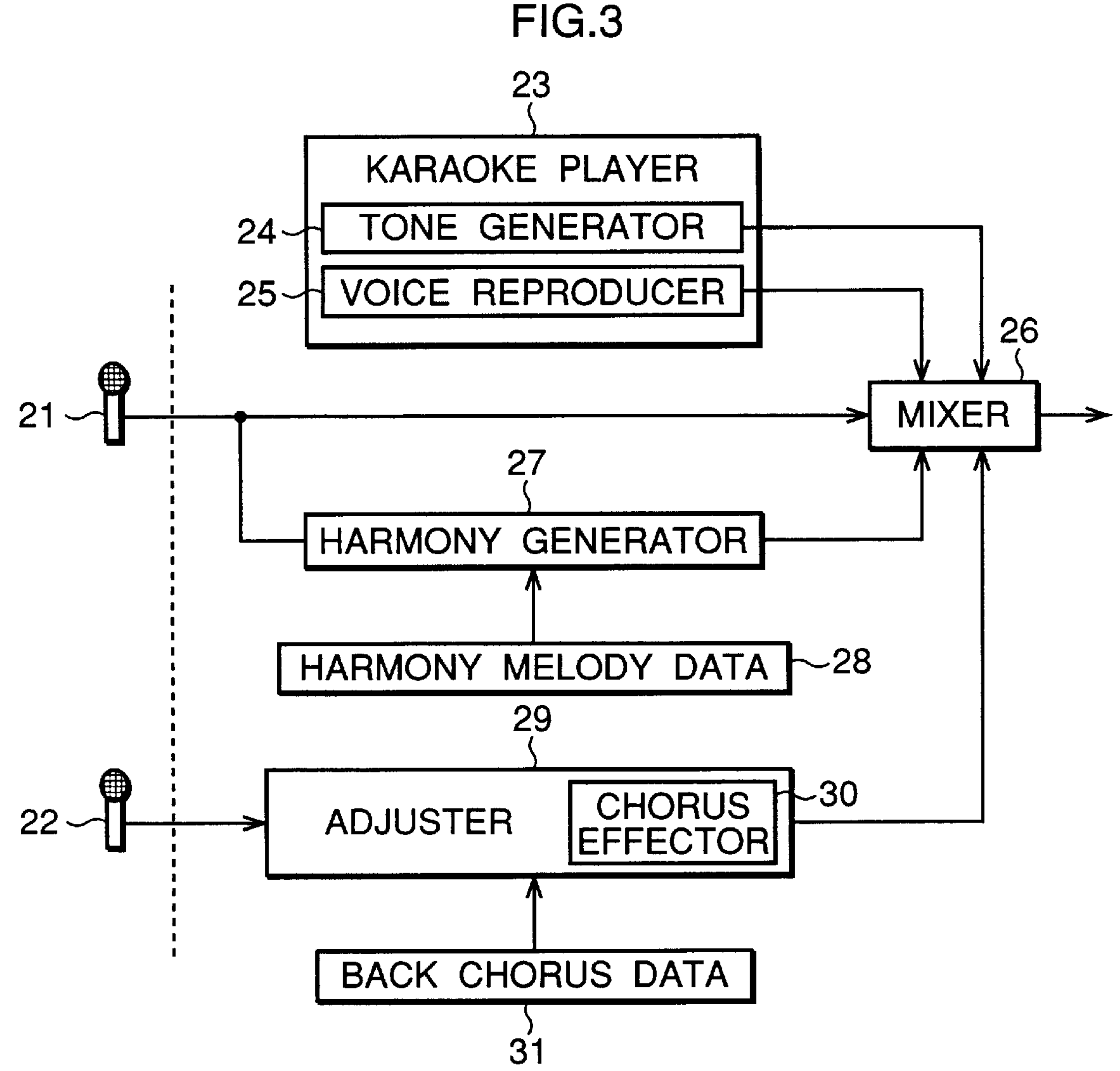
FIG. 3 is a schematic block diagram illustrating a modified form of the karaoke apparatus of the second preferred embodiment with a harmony melody generating capability added.

This invention will be described in further detail by way of example with reference to the accompanying drawings. FIGS. 1 through 3 are schematic block diagrams illustrating various embodiments of the karaoke apparatus according to the present invention. FIG. 1 is the schematic block diagram illustrating the karaoke apparatus practiced as a first preferred embodiment of the present invention. The karaoke apparatus contains a karaoke player 3 that processes song data for karaoke performance and that generates a karaoke accompaniment sound based on the processed song data. This karaoke accompaniment sound is inputted in a mixer 4. A main vocal microphone 1 or first microphone is connected to the mixer 4. The microphone 1 is used by a main singer. A singing voice signal of a main melody sung by the main singer is inputted from the microphone 1 directly into the mixer 4. A sub vocal microphone 2 or second microphone is connected to an adjuster 5. The sub vocal microphone 2 is used by a sub singer. The sub singer sings a harmony melody in synchronization with the above-mentioned karaoke accompaniment sound and the singing voice of the main singer. A singing voice signal of the harmony melody is inputted from the microphone 2 into the adjuster 5. The adjuster 5 adjusts the actual pitch of the singing voice signal inputted from the microphone 2 to the correct pitch of the harmony melody. As described above, the sub singer is actually singing the harmony melody. However, many harmony melodies have difficult melody patterns to follow. It is also difficult to correctly recognize when to start voicing a phrase of the harmony melody. Often, a sub singer goes out of tune from the correct pitch of the harmony melody, or even worse cannot sing it at all. If the signing voice signal of the harmony melody is outputted as it is and mixed with the singing voice signal of the main melody, the harmony melody singing voice may not sound in consonance with the main melody singing voice but may disturb the main melody singing voice. Hence, in the adjuster 5, the pitch of the signing voice signal inputted from the sub vocal microphone 2 is corrected to the legitimate pitch of the harmony melody. This correction is performed based on reference data or harmony melody data 6, which is MIDI data indicative of the legitimate pitch of the harmony melody. The pitch of the singing voice signal inputted from the microphone 2 is corrected to the pitch indicated by this harmony melody data 6. This harmony melody data 6 is included in the song data provided for karaoke performance. The harmony melody data 6 is read in synchronization with the karaoke performance by the karaoke player 3. The singing voice signal corrected in pitch by the adjuster 5 is then inputted in the mixer 4. The mixer 4 mixes the karaoke accompaniment sound signal inputted from the karaoke player 3, the main melody singing voice signal inputted from the main vocal microphone 1, and the corrected harmony melody singing voice signal inputted from the adjuster 5 altogether at a predetermined gain ratio, and outputs a resultant signal as a 2-channel stereo signal. The mixer 4 is connected to a succeeding stage of an audio amplifier and a speaker by which this stereo signal is amplified and sounded.

The above-mentioned adjuster 5 not only corrects the harmony melody singing voice signal to the pitch of the correct harmony melody, but also performs the following processing. When the harmony melody need not be sung at a rest event of the harmony melody part, if a singing voice signal is inputted inadvertently from the sub vocal microphone 2, mute processing is performed. Namely, if the sub singer sings erroneously where no harmony melody is required, the adjuster 5 mutes this singing voice signal so as not to disturb the main melody. In the mute processing, the harmony signing voice signal is not at all outputted to the mixer 4. Alternatively, the volume in which the singing voice signal is outputted to the mixer 4 may be decreased.

Conversely, no signing voice signal of the harmony melody part may be inputted from the sub vocal microphone 2 where the harmony melody should be sung. If the sub singer fails to sing the harmony melody where he or she should, the adjuster 5 receives the singing voice signal from the main vocal microphone 1, then frequency-converts the received singing voice signal, and shapes the converted signal into the harmony melody singing voice signal. This arrangement allows adding the harmony melody to the main melody even if the sub singer fails to sing the harmony melody, thereby enhancing promotion of karaoke performance.

According to the present invention, the karaoke apparatus is constructed for playing a karaoke song according to song data jointly with a first vocal part and a second vocal part. In the inventive karaoke apparatus, a generator device in the form of the karaoke player 3 processes the song data to produce an orchestral accompaniment sound during the course of play of the karaoke song. A first input device in the form of the first microphone 1 collects a first singing voice which is physically sung along the orchestral accompaniment sound to fit with the first vocal part. A second input device in the form of the second microphone 2 collects a second singing voice which is physically sung along the orchestral accompaniment sound to support the first singing voice. An adjuster device in the form of the adjuster 5 adjusts at least a pitch of the second singing voice collected by the second input device according to reference data contained in the song data so as to fit the second singing voice with the second vocal part. A mixer device in the form of the mixer 4 mixes the first singing voice collected by the first input device and the second singing voice fed from the adjuster device together with the orchestral accompaniment sound to thereby effect play of the karaoke song.

Particularly in the first embodiment shown in FIG. 1, the first microphone 1 collects the first singing voice which is sung along a main melody allotted to the first vocal part, while the second microphone 2 collects the second singing voice which is sung along a harmony melody allotted to the second vocal part and made consonant with the main melody. The adjuster 5 adjusts the second singing voice according to the reference data in the form of the harmony melody data 6 representative of the harmony melody. Preferably, the adjuster 5 includes a muting section that mutes the second singing voice when the same is incorrectly sung at a rest event of the harmony melody. Preferably, the adjuster 5 further comprises a harmony section that operates when the second singing voice is incorrectly not sung to miss note events contained in the harmony melody for modifying the first singing voice according to the harmony melody data 6 to fit with the second vocal part in place of the missing second singing voice.

FIG. 2 is a schematic block diagram illustrating a karaoke apparatus practiced as a second preferred embodiment of the present invention. A karaoke player 13 processes song data for karaoke performance to sound a karaoke accompaniment sound. This karaoke player 13 is composed of a tone generator 14 and a voice reproducer 15 for reproducing voices such as a back chorus. The instrumental accompaniment sound generated by the tone generator 14 and the back chorus voice reproduced by the voice reproducer 15 are inputted in a mixer 16. A main vocal microphone 11 or first microphone is directly connected to the mixer 16. The main vocal microphone 11 is used by a main singer. A singing voice signal of the main melody sung by the main singer is directly inputted in the mixer 16. A sub vocal microphone or second microphone is connected to an adjuster 17. The sub vocal microphone 12 is used by a sub singer. In this embodiment, the sub singer sings a back chorus along with the above-mentioned karaoke accompaniment sound and the singing voice of the main singer. This singing voice signal is inputted in the adjuster 17. The adjuster 17 corrects the pitch of the singing voice signal inputted from the sub vocal microphone 12 to the pitch of the correct back chorus. As described above, the sub singer is singing the back chorus. However, the pitch and voicing timing of the back chorus are difficult for the sub singer to grasp. The sub singer often gets out of the pitch or cannot sing at all. Therefore, if this singing voice signal of the back chorus is outputted without adjustment to be mixed with the singing voice signal of the main melody, the chorus melody singing voice may not sound in consonance with the main melody singing voice, thereby disturbing the main melody. To overcome this problem, the pitch of the singing voice signal inputted from the sub vocal microphone 12 is correctly matched with the legitimate pitch of the back chorus by the adjuster 17. This correction is performed based on reference data or back chorus data 19, which is MIDI data indicative of the correct pitch of the back chorus. The singing voice signal inputted from the microphone 12 is corrected so as to match with the pitch (frequency) indicated by this back chorus data 19. This back chorus data 19 is included in the above-mentioned song data provided for karaoke performance and read out in synchronization with the karaoke performance by the karaoke player 13 from a data storage.

It should be noted that the voice reproducer 15 of the karaoke player 13 reproduces a synthetic or artificial back chorus voice based on voice data. The voice data is obtained by converting a voice signal sampled from an actual back chorus into PCM data. The voice data is incorporated into the song data. The voice data is decoded by the voice reproducer 15 to reproduce the sampled back chorus voice.

The back chorus data used by the adjuster 17 is obtained by converting the pitch and duration of a typical back chorus pattern into a MIDI format. The adjuster 17 corrects the pitch of the inputted singing voice signal to the pitch of the typical back chorus, and then attaches a chorus effect to this singing voice signal through an incorporated chorus effector 18. The chorus effect is such that voice signal components having minutely shifted pitches are added to sound as if many singers are singing at a time. In this embodiment, a plurality of singing voice signal components slightly shifted from the pitch of the correct back chorus are generated by use of the above-mentioned pitch correcting capability. The generated singing voice signal components are added together to provide the chorus effect. The singing voice signal corrected in pitch and attached with the chorus effect by the adjuster 17 is inputted in the mixer 16. The mixer 16 mixes the orchestral accompaniment sound signal for karaoke play inputted from the karaoke player 13, the main melody singing voice signal inputted from the main vocal microphone 11, and the back chorus singing voice signal corrected in pitch and attached with the back chorus effect by the adjuster 17 altogether at a predetermined gain ratio, and outputs the resultant signal as a 2-channel stereo signal. This mixer 16 is connected to a succeeding stage of an audio amplifier and a speaker by which this stereo signal is amplified and sounded.

In the above-mentioned embodiment, a singing voice signal may be inputted from the sub vocal microphone 12 where the back chorus is at a rest event and therefore need not be sung. If the sub singer sings by mistake where there is no back chorus part, the adjuster 17 mutes this singing voice signal so as not to disturb the main melody. In this mute processing, the singing voice signal of the back chorus is completely prevented from being outputted to the mixer 16. Alternatively, in consideration of contribution of the sub singer, the volume of the singing voice signal to be outputted to the mixer 16 may be decreased.

Conversely, when the sub singer is correctly singing the back chorus, the singing voice signal of the back chorus is inputted from the microphone 12. In this case, this singing voice signal is fed to the mixer 16 as the back chorus. At the same time, the synthetic voice signal of the back chorus generated by the karaoke player 13 may be also inputted in the mixer 16 if there is no control. If both of these signals are outputted to the amplifier, the singing voice of the sub singer is not conspicuous. Besides, outputting two channels of back choruses puts karaoke performance out of balance. Therefore, in this embodiment, if the singing voice signal of the back chorus is inputted from the adjuster 17, the mixer 16 mutes the reproduced synthetic voice signal of the back chorus inputted from the voice reproducer 15 of the karaoke player 13. In this mute processing, the reproduced synthetic voice signal is not outputted to the subsequent stage at all. Alternatively, the reproduced synthetic voice signal may be outputted to the subsequent stage by lowering its volume to a degree that guides the sub singer.

In this embodiment shown in FIG. 2, the first microphone 11 collects a first singing voice which is sung along a solo melody allotted to a first vocal part, while the second microphone 12 collects a second singing voice which is sung along a chorus melody allotted to a second vocal part and made to back the solo melody. The adjuster 17 adjusts the second singing voice according to reference data in the form of the back chorus data 19 representative of the chorus melody. Preferably, the adjuster 17 includes a muting section that mutes the second singing voice when the same is incorrectly sung at a rest event of the chorus melody. Preferably, the karaoke player 13 includes a chorus section in the form of the voice reproducer 15 that generates the synthetic singing voice. The mixer 16 operates when the second singing voice is not sung for selecting the synthetic singing voice to fill the second vocal part in place of the second singing voice, and otherwise operates when the second singing voice is sung for muting the synthetic singing voice.

FIG. 3 is a schematic block diagram illustrating a modification of the above-mentioned second preferred embodiment with a harmony melody part generating capability added. A karaoke player 23 processes song data prepared for karaoke performance to generate a karaoke accompaniment sound. This karaoke player 23 is composed of a tone generator 24 for generating an orchestral accompaniment sound and a voice reproducer 25 for reproducing synthetic voices such as a back chorus. It should be noted that voice data to be reproduced by the voice reproducer 25 of the karaoke player 23 is provisionally obtained by performing PCM on a back chorus voice signal sampled from a model back chorus voice. The voice data is prepared as a part of the song data. The orchestral accompaniment sound generated by the tone generator 24 and the synthetic voice of the back chorus generated by the voice reproducer 25 are inputted in a mixer 26.

A main vocal microphone 21, the first microphone, is connected to the mixer 26 and a harmony generator 27. The main vocal microphone 21 is used by a main singer. A singing voice signal of a main melody sung by the main singer is inputted in the mixer 26 and the harmony generator 27. The harmony generator 27 frequency-converts the singing voice signal of the main melody inputted from the main vocal microphone 21 to generate a singing voice signal of a harmony melody. This frequency conversion is performed based on harmony melody data 28, which is MIDI data representative of the harmony melody. This harmony melody data is included in the above-mentioned song data prepared for karaoke performance and read from a storage in synchronization with the karaoke performance by the karaoke player 23. It should be noted that the technology of processing a main melody singing voice signal to generate a harmony part singing voice signal is disclosed in Japanese Patent Application No. Hei 7-41767, for example. The harmony melody singing voice signal generated by the harmony generator 27 is inputted in the mixer 26.

A sub vocal microphone 22, the second microphone, is connected to an adjuster 29. The sub vocal microphone 22 is used by a sub singer. In this embodiment, the sub singer sings a back chorus along the above-mentioned karaoke accompaniment sound and the singing voice of the main singer. The singing voice signal collected by the second microphone 22 is inputted in the adjuster 29. The adjuster 29 corrects the pitch of the singing voice signal inputted from the sub vocal microphone 22 to the pitch of the correct back chorus. This correction is performed based on back chorus data 31, which is MIDI data of the back chorus. This back chorus data 31 is included in the above-mentioned song data for karaoke performance, and is read in synchronization with karaoke performance by the karaoke player 23.

The adjuster 29 corrects the pitch of the inputted singing voice signal to the pitch of the correct back chorus and attaches a chorus effect to the corrected signal through an incorporated chorus effector 30. The singing voice signal corrected in pitch and attached with the chorus effect by the adjuster 29 is inputted in the mixer 26. The mixer 26 mixes altogether the orchestral accompaniment sound signal and the synthetic singing voice signal of the back chorus inputted from the karaoke player 23, the main melody singing voice signal inputted from the main vocal microphone 21, the harmony melody singing voice signal generated by the harmony generator 27, and the corrected back chorus singing voice signal attached with the chorus effect by the adjuster 29 at a predetermined gain ratio, and outputs the resultant signal as a 2-channel stereo signal. This mixer 26 is connected to a succeeding stage of an audio amplifier and a speaker by which this stereo signal is amplified and sounded.

In the above-mentioned embodiment, when the sub singer is correctly signing a back chorus, the singing voice signal is inputted from the microphone 22 every time the back chorus is required. In this case, the actual singing voice signal is inputted as the back chorus into the mixer 26. At the same time, the synthetic singing voice signal of the back chorus reproduced by the karaoke player 23 may be also inputted in the mixer 26 if there is no control. If both of these signals are outputted to the amplifier, the actual singing voice of the sub singer is not conspicuous over the synthetic singing voice. Besides, outputting two systems of back choruses puts karaoke performance out of balance. Therefore, if the singing voice signal of the back chorus is inputted from the adjuster 29, the mixer 26 mutes the reproduced synthetic voice signal of the back chorus inputted from the voice reproducer 25 of the karaoke player 23. In this mute processing, the reproduced synthetic voice signal is not outputted to the subsequent stage at all. Alternatively, the reproduced synthetic voice signal may be outputted to the subsequent stage by lowering its volume to a degree that only necessary to guide the sub singer.

It should be noted that, in the above-mentioned embodiment, a singing voice signal may be inputted from the sub vocal microphone 22 at a time when the back chorus is at a rest event and therefore need not be sung. If the sub singer sings the back chorus by mistake where no back chorus is required, the adjuster 29 mutes this singing voice signal to prevent intervention with the main melody. In this mute processing, the singing voice signal is not at all outputted to the mixer 26. Alternatively, in consideration of the originality of the sub singer, the volume of the singing voice signal to be outputted from the mixer 16 may be compromised.

The constitution of the preferred embodiment shown in FIG. 3 is summarized as follows. Namely, the karaoke apparatus according to the invention comprises a generating means for generating a karaoke performance signal including an accompaniment sound signal and a synthetic singing voice signal of a back chorus for karaoke music having a main melody part, a chorus melody part and a harmony melody part, a first microphone for inputting a main melody singing voice signal, a second microphone for inputting a singing voice signal of the back chorus, a harmony melody generating means for generating a singing voice signal of the harmony melody part derived from the singing voice signal inputted from the first microphone, an adjusting means for generating a back chorus singing signal by correcting at least the frequency of the singing voice signal inputted from the second microphone, and a mixing means for mixing at least the accompaniment sound signal generated by the generating means, the singing voice signal inputted from the first microphone, the singing voice signal generated by the harmony melody generating means, and the singing voice signal corrected by the adjusting means altogether and outputting the resultant mixed signal. Stated otherwise, the karaoke apparatus of FIG. 3 comprises a harmony device in the form of the harmony generator 27 that creates a harmony singing voice which is derived from the main singing voice and which is made consonant with the main singing voice.

According to the above-mentioned constitution, the harmony melody is generated from the main melody singing voice signal inputted from the first microphone. Because the back chorus part is open to singers, a plurality of singers can enjoy karaoke play. Further, karaoke singers can sing all parts without using a recorded or synthetic voice. In this case, at least the frequency of the singing voice signal of the back chorus which is more difficult to sing than the main melody is corrected, hence the sub singer can join the back chorus more easily. Namely, the back chorus singer does not disturb the total harmony of the karaoke music by keeping the pitch of the back chorus.

Figure 5:
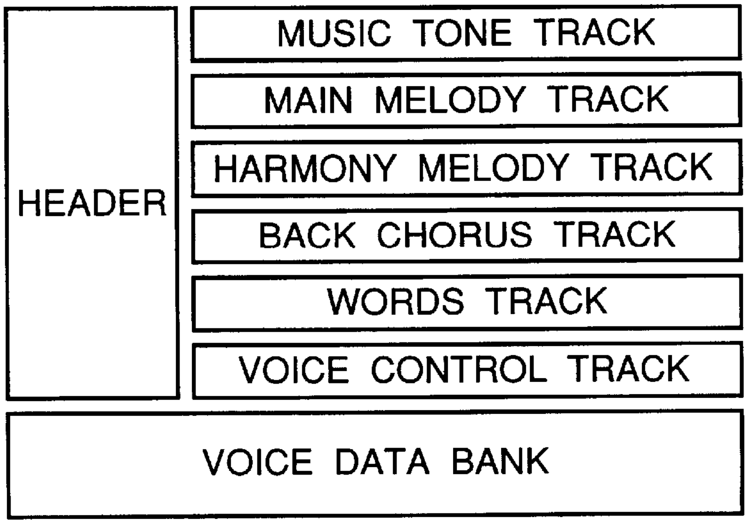
FIG. 5 is a table diagram illustrating a structure of song data for use in the karaoke apparatus of FIG. 4.
Figure 4:
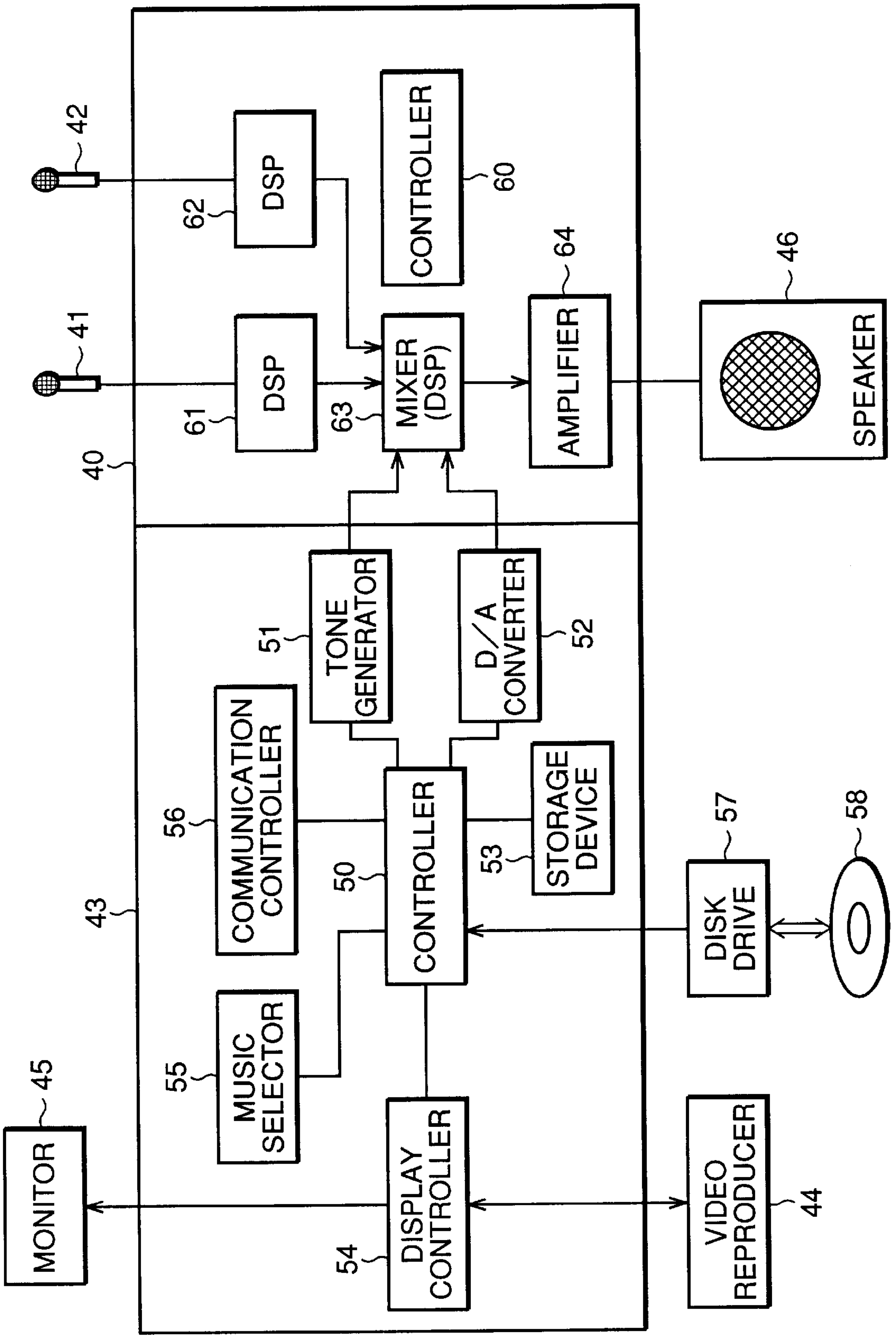
FIG. 4 is a block diagram illustrating a karaoke apparatus practiced as a preferred embodiment of the present invention.

The capability of the karaoke player 3, 13 or 23 included in each of the preferred embodiments shown in FIGS. 1 through 3 is implemented by a controller and a tone generator. The capabilities of the adjuster and the harmony generator are implemented by DSPs. FIG. 4 is a block diagram illustrating a karaoke apparatus having these controller, tone generator, and DSPs. FIG. 5 shows a structure of song data used in this karaoke apparatus. This karaoke apparatus is constructed to perform the operations of the preferred embodiments shown in FIGS. 1 through 3. This karaoke apparatus is composed of two microphones 41 and 42, a karaoke main unit 43, a mixing amplifier unit 40, a video reproducer 44, a monitor 45, a speaker 46, and a disk drive 57 receivable of a machine readable medium 58 such as a floppy disk or a CD-ROM. The operation of the karaoke main unit 43 is controlled by a controller 50 containing a CPU. The controller 50 is connected to a storage device 53, a tone generator 51, a D/A converter 52, a display controller 54, a music selector 55, and a communication controller 56. The storage device 53 is composed of a hard disk drive or the like, storing about 10,000 pieces of music of song data. The music selector 55 receives a music selection code outputted from an infrared remote commander, not shown, and inputs the received code into the controller 50. The controller 50 reads the song data corresponding to this music selection code from the storage device 53, and processes the read song data sequentially by following a tempo, thereby making karaoke performance.

As shown in FIG. 5, the song data of one music piece is composed of a header, a music tone track, a main melody track, a harmony melody track, a back chorus track, a words track, a voice control track, and a voice data bank. The header is written with various items of index data associated with this song data; to be more specific, a selection code, a genre code, a title, a release date, and a play time of this music piece. Based on the genre code, the controller 50 selects a video to be displayed on the monitor 45, and instructs the video reproducer 44 to reproduce the selected video. The video reproducer 44 is composed of an LD changer that stores a plurality of Laser Discs (trademark) for example, reproduces the specified video, and outputs the reproduced video to the display controller 54.

Each of the music tone track through the voice control track is described in an ordinary MIDI format or an extended MIDI format. Each track is composed of plural pieces of event data and duration data that indicates a time interval between these pieces of event data. The music tone track is formed with various sub tracks such as a melody track and a rhythm track. According to a timing indicated by the duration data, the controller 50 inputs the event data of this music tone track into the tone generator 51. Based on the inputted event data, the tone generator 51 forms a karaoke accompaniment sound signal. The main melody track is written with main melody data indicative of a main melody. The harmony melody track is written with harmony melody data. The back chorus track is written with back chorus data. The harmony melody data is inputted in the mixing amplifier unit 40 for correcting or generating the above-mentioned harmony melody singing voice signal. The back chorus data is inputted in the mixing amplifier unit 40 for correcting the back chorus singing voice signal. In the mixing amplifier unit 40, a controller 60 receives these pieces of data and inputs the same into a DSP 61 or a DSP 62 whichever is appropriate. The main melody data is used for forming a tone signal of a so-called guide melody.

The words track stores character code data as event data for displaying words on the monitor 45. The controller 50 inputs the event data from the words track into the display controller 54 in a timing specified by the duration data. The display controller 54 superimposes a character pattern of the words data inputted from the controller 50 onto a video inputted from the video reproducer 44, and displays a resultant composite image onto the monitor 45.

The voice data bank is composed of plural pieces of voice data. The voice data is obtained by performing PCM on a raw back chorus singing voice. Generally, a back chorus is not continuously sung throughout the karaoke play of the selected music piece. Consequently, only phrases of the back chorus part are taken out of the music piece, and are divided into plural sections corresponding to the phrases. The voice control track stores voice designation data as event data for specifying generation of each voice data section stored in the voice data bank. The controller 50 reads the voice designation data in a timing specified by the duration data. The controller 50 inputs the voice data specified by this voice designation data into the D/A converter 52. The D/A converter 52 decodes the voice data, which is PCM data, into an analog voice signal, and inputs this signal into a mixer 63 in the mixing amplifier unit 40.

The mixing amplifier unit 40 is composed of the mixer 63, the DSP 61, the DSP 62, and an amplifier 64. The operation of these devices is controlled by the controller 60. The DSP 61 is connected to the main vocal microphone 41. The DSP 62 is connected to the sub vocal microphone 42. Therefore, the singing voice signal of the main singer is inputted in the DSP 61. The singing voice signal of the sub singer is inputted in the DSP 62. The DSP 61 performs the function of the harmony generator 27 shown in FIG. 3. The DSP 62 performs the function of the adjuster 5 shown in FIG. 1, the adjuster 17 shown in FIG. 2, or the adjuster 29 shown in FIG. 3. The singing voice signals outputted from the DSP 61 and DSP 62 are inputted in the mixer 63. The mixer 63 receives the sound signal formed by the tone generator 51, the back chorus signal reproduced by the D/A converter 52, and the singing voice signals processed by the DSP 61 and the DSP 62.

The raw singing voice signals inputted from the microphones 41 and 42 are inputted in the mixer 63 via the DSP 61 and the DSP 62. The mixer 63 functions as the mixer 4 shown in FIG. 1, the mixer 16 shown in FIG. 2, or the mixer 26 shown in FIG. 3 depending on setting of operation modes. The mixer 63 mixes the inputted signals together into a 2-channel stereo signal. The resultant 2-channel stereo signal is inputted in the amplifier 64. The amplified signal is sounded from the speaker 46.

Figure 6A:
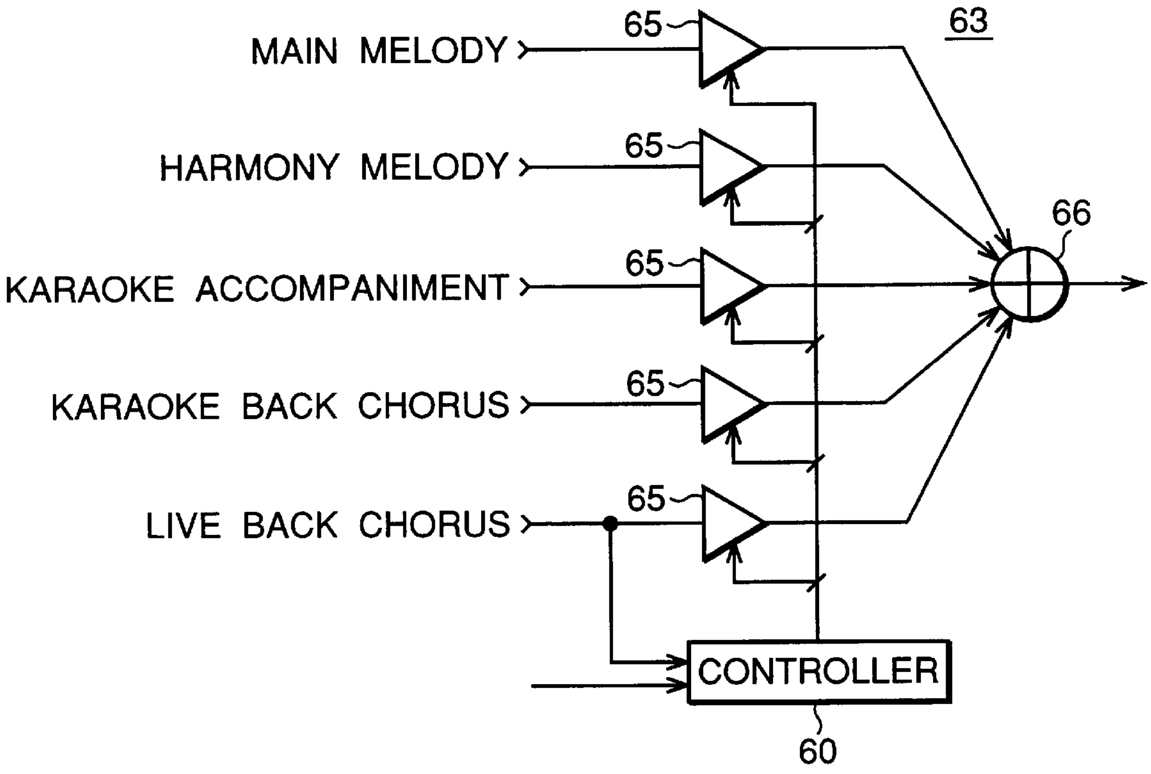
FIGS. 6(A) and 6(B) are diagrams illustrating constitution and operation of a mixer used in the karaoke apparatus of FIG. 4.
Figure 6B:
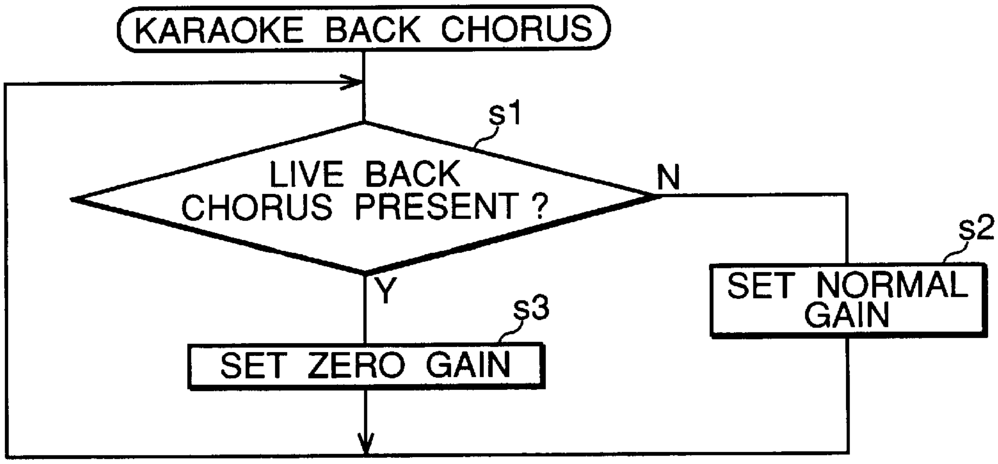

FIG. 6(A) shows a detailed construction of the above-mentioned mixer 63. FIG. 6(B) shows operation of the mixer 63. The mixer 63 is a 2-channel stereo mixer, and actually has two systems of the circuit shown in FIG. 6(A) in parallel. This circuit may be an analog circuit or a digital circuit. For the digital circuit, the input terminal thereof is provided with an AID converter. Alternatively, all signals are inputted in digital form into the circuit, which is provided at the output terminal thereof with a D/A converter. In FIG. 6(A), the mixer 63 has input terminals of five channels in which the main melody singing voice signal, the harmony melody singing voice signal, the karaoke accompaniment sound signal, the synthetic or karaoke back chorus signal reproduced by the D/A converter, and the actual or live back chorus singing voice signal are inputted, respectively. However, depending on the operation mode of the karaoke apparatus, the harmony melody singing voice signal or the live back chorus singing voice signal may not be inputted. Each of these sound and voice signals is inputted in its corresponding voltage-controlled amplifier 65. A voltage for setting a gain to each voltage-controlled amplifier 65 is supplied from the controller 60. The controller 60 inputs a gain setting voltage specified by the karaoke main unit 40 or a gain setting voltage inputted from an operator panel into each voltage-controlled amplifier 65. Each voltage-controlled amplifier 65 amplifies the inputted signal at the set gain, and outputs the amplified signal to an adder 66. The adder 66 adds the inputted signals and outputs a resultant signal to the amplifier 64. The live back chorus singing voice signal is also inputted in the controller 60.

FIG. 6(B) shows operation by the controller 60 for controlling the karaoke back chorus channel. The controller 60 controls the karaoke back chorus channel into which the synthetic back chorus voice signal obtained by reproducing the PCM data by the D/A converter is inputted. First, the controller 60 determines whether the live back chorus singing voice signal is inputted (s1). This singing voice signal is inputted from the DSP 62 in the operation mode shown in FIG. 2 or 3. If this singing voice is not inputted, the controller 60 performs normal gain setting on the karaoke back chorus channel (s2). Namely, the controller 60 sets the gain specified by the karaoke main unit 40 or the gain inputted from the operator panel. If the back chorus singing voice signal is inputted, the controller 60 sets a null gain to the karaoke back chorus channel to mute the synthetic back chorus voice in order to make the live back chorus singing voice signal conspicuous and maintain the balance of the back chorus (s3).

Referring back to FIG. 4, the machine readable medium 58 is provided in the form of a removable disk for use in the karaoke apparatus having a CPU in the controller 50 and playing a karaoke song according to song data jointly with a first vocal part and a second vocal part. The medium 58 is loaded into the disk drive 57 and contains program instructions executable by the CPU for causing the karaoke apparatus to perform the steps of processing the song data to produce an orchestral accompaniment sound during the course of play of the karaoke song, collecting a first singing voice which is physically sung along the orchestral accompaniment sound to fit with the first vocal part, separately collecting a second singing voice which is physically sung along the orchestral accompaniment sound in parallel to the first singing voice to support the first singing voice, adjusting at least a pitch of the collected second singing voice according to reference data contained in the song data so as to fit the second singing voice with the second vocal part, and mixing the collected first singing voice and the adjusted second singing voice together with the generated orchestral accompaniment sound to thereby effect play of the karaoke song.

In one form, the step of collecting comprises collecting the first singing voice which is sung along a main melody allotted to the first vocal part, while the step of separately collecting comprises collecting the second singing voice which is sung along a harmony melody allotted to the second vocal part and made consonant with the main melody, and the step of adjusting comprises adjusting the collected second singing voice according to reference data representative of the harmony melody. Preferably, the step of adjusting further comprises muting the collected second singing voice when the same is incorrectly sung at a rest event of the harmony melody. Preferably, the steps performed by the karaoke apparatus further comprise modifying the collected first singing voice according to the reference data to fit with the second vocal part in place of the second singing voice when the second singing voice is incorrectly not sung to miss note events contained in the harmony melody.

In another form, the step of collecting comprises collecting the first singing voice which is sung along a solo melody allotted to the first vocal part, while the step of separately collecting comprises collecting the second singing voice which is sung along a chorus melody allotted to the second vocal part and made to back the solo melody, and the step of adjusting comprises adjusting the collected second singing voice according to reference data representative of the chorus melody. Preferably, the step of adjusting further comprises muting the collected second singing voice when the same is incorrectly sung at a rest event of the chorus melody. Preferably, the step of processing includes generating a synthetic singing voice to fill the second vocal part in place of the second singing voice when the second singing voice is not sung, and otherwise muting the synthetic singing voice when the second singing voice is sung. Preferably, the steps performed by the karaoke apparatus further comprise creating a harmony singing voice which is derived from the first singing voice and which is made consonant with the first singing voice.

Figure 7:
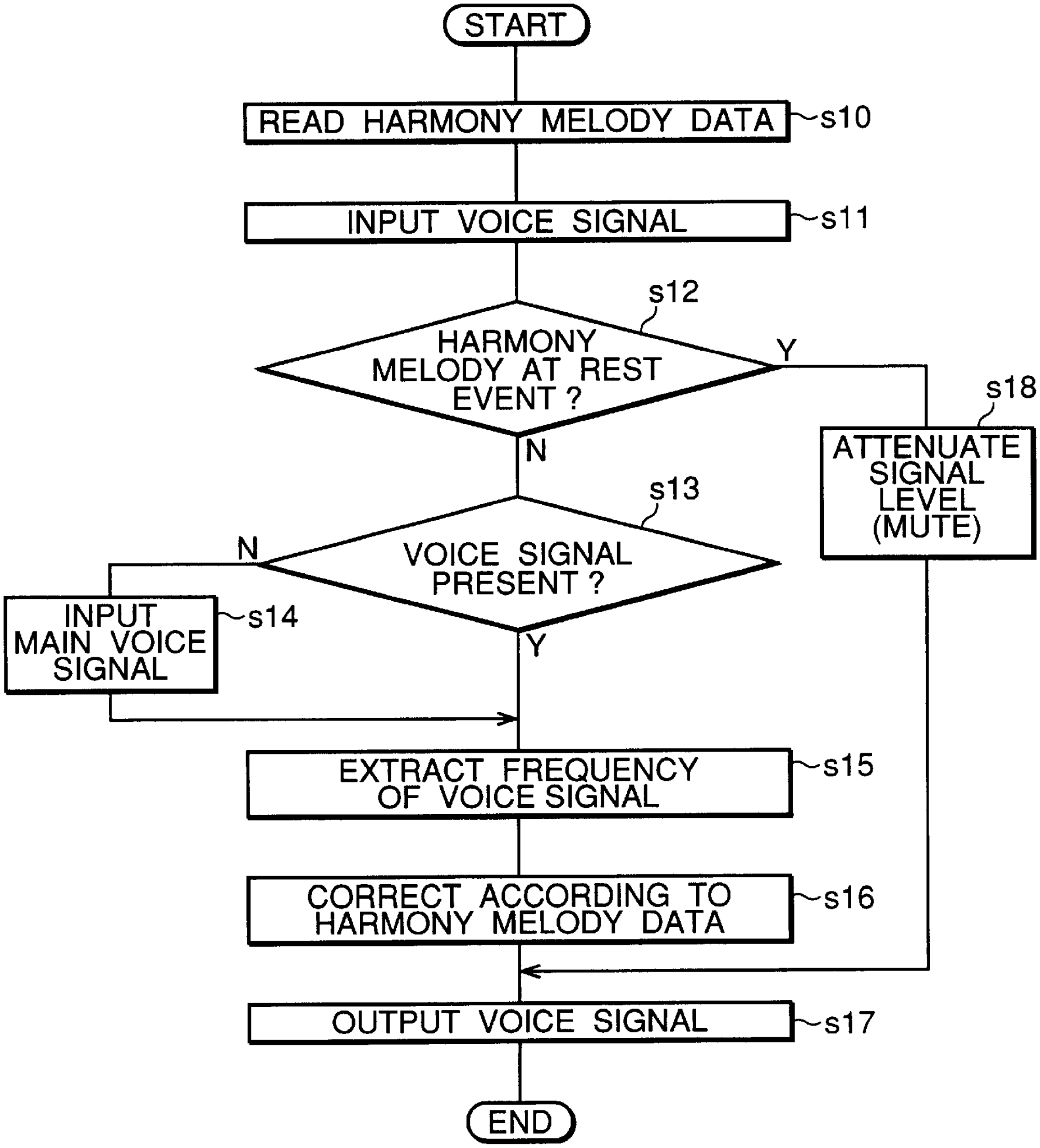
FIG. 7 is a flowchart describing operation of a DSP used in the karaoke apparatus of FIG. 4.

FIG. 7 is a flowchart of a microprogram set in the DSP 62 when the karaoke apparatus executes the operation mode shown in FIG. 1. This operation is performed repeatedly in every sampling timing (every 1/44100 second for audio CD quality). First, the harmony melody data contained in the song data is read via the controller 50 and the controller 60 (s10). At the same time, the DSP 62 receives a singing voice signal from the microphone 42 (s11). Next, the DSP 62 determines whether the harmony melody data read in step s10 indicates a rest event (s12).

If the harmony melody data does not indicate a rest event, the DSP 62 determines whether an amplitude of the singing voice signal inputted in step s11 is higher than a threshold level (s13). If the singing voice signal is found higher than that level, the DSP 62 extracts the frequency of this singing voice signal (s15). The DSP 62 corrects the extracted frequency to the frequency of the harmony melody data read in step s10 (s16). Then, the DSP 62 outputs the corrected singing voice signal to the mixer 63 as a harmony melody singing voice signal. If the singing voice signal inputted in step s11 is found not reaching the threshold level and hence unavailable as a harmony melody singing voice signal, the DSP 62 captures the main melody singing voice signal from the microphone 41 (s14). Then, the DSP 62 performs the operation of step s15 and subsequent steps. In this case, the processing of step s16 is frequency conversion processing rather than frequency correction processing. Namely, the main vocal is pitch-shifted to generate a harmony vocal.

On the other hand, if the harmony melody data is found indicating a rest event in step s12, the DSP 62 does not convert the frequency of the singing voice signal inputted in step s11, but attenuates the signal level (s18) and outputs the attenuated signal to the mixer 63 (s17). In step s18, the DSP 62 may set the signal level of the singing voice signal to zero, thereby preventing the signal from being outputted to the mixer 63 at all.

Figure 8:
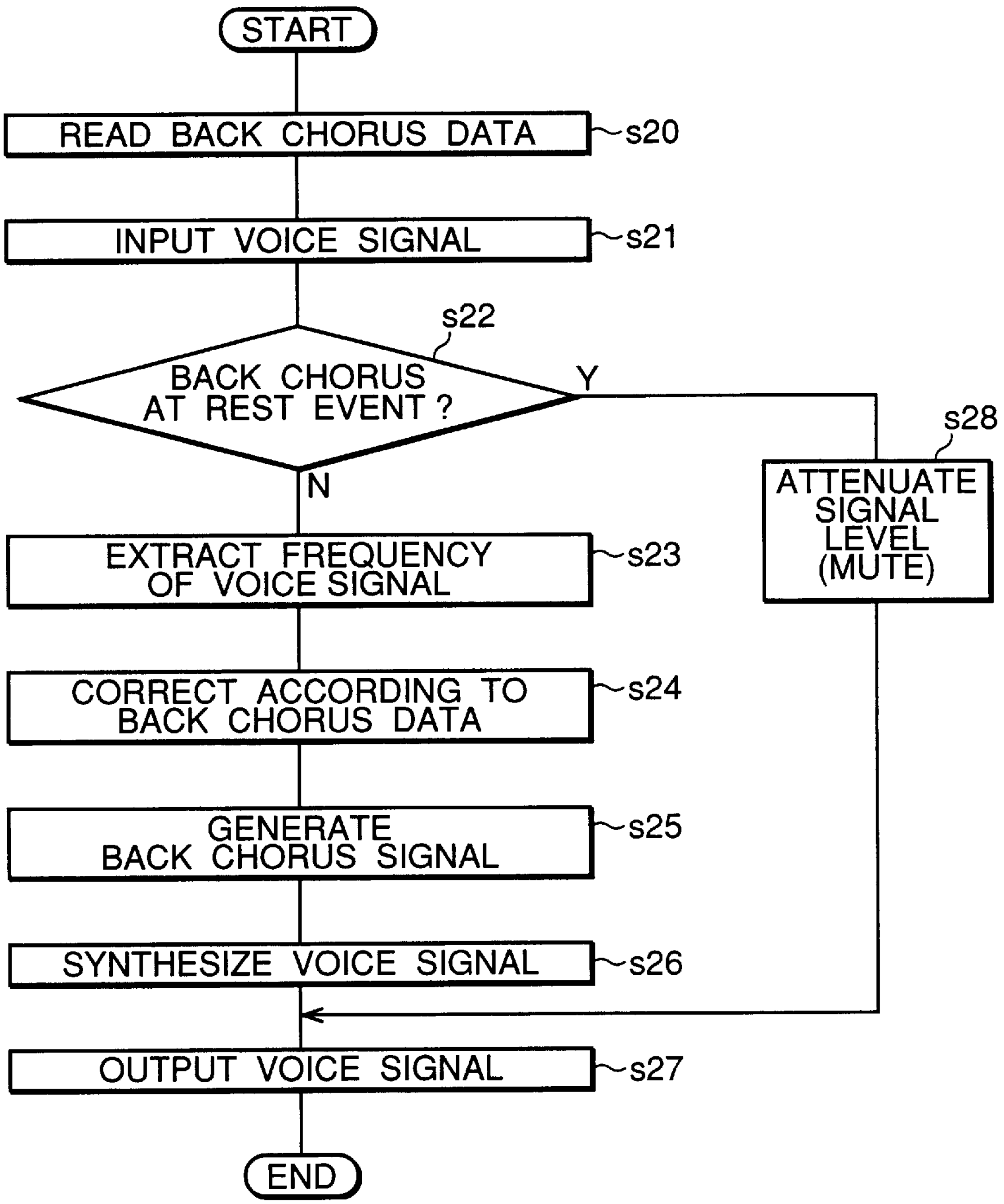
FIG. 8 is a flowchart describing operation of the DSP used in the karaoke apparatus of FIG. 4.

FIG. 8 is a flowchart of a microprogram set to the DSP 62 when the above-mentioned karaoke apparatus executes the operation mode shown in FIG. 2 or 3. This operation is performed repeatedly in every sampling timing (every 1/44100 second for audio CD quality). First, the back chorus data contained in the song data is read via the controller 50 and the controller 60 (s20). At the same time, the DSP 62 receives a singing voice signal from the microphone 42 (s21). Next, the DSP 62 determines whether the back chorus data read in step s20 indicates a rest event (s22).

If the back chorus data does not indicate a rest event, the DSP 62 extracts the frequency of this singing voice signal inputted in step s21 (s23). The DSP 62 corrects the extracted frequency to the frequency of the back chorus data read in step s20 (s24). Then, based on the singing voice signal processed in step s24, the DSP 62 generates a plurality of singing voice signals having minutely different frequencies and phases such that the frequency-corrected singing voice signal sounds like a chorus (s25). The DSP 62 composes the singing voice signal corrected in step s24 and the singing voice signals generated in step s25 together (s26). The DSP 62 outputs the resultant composite signal to the mixer 63 as a back chorus singing voice signal (s27).

On the other hand, if the back chorus data is found indicating a rest event in step s22, the DSP 62 does not convert the frequency of the singing voice signal inputted in step s21, but attenuates the signal level (s28), and outputs the attenuated signal to the mixer 63 (s27). In step s28, the DSP 62 may set the signal level of the singing voice signal to zero, thereby preventing the signal from being outputted to the mixer 63 at all.

Figure 9:
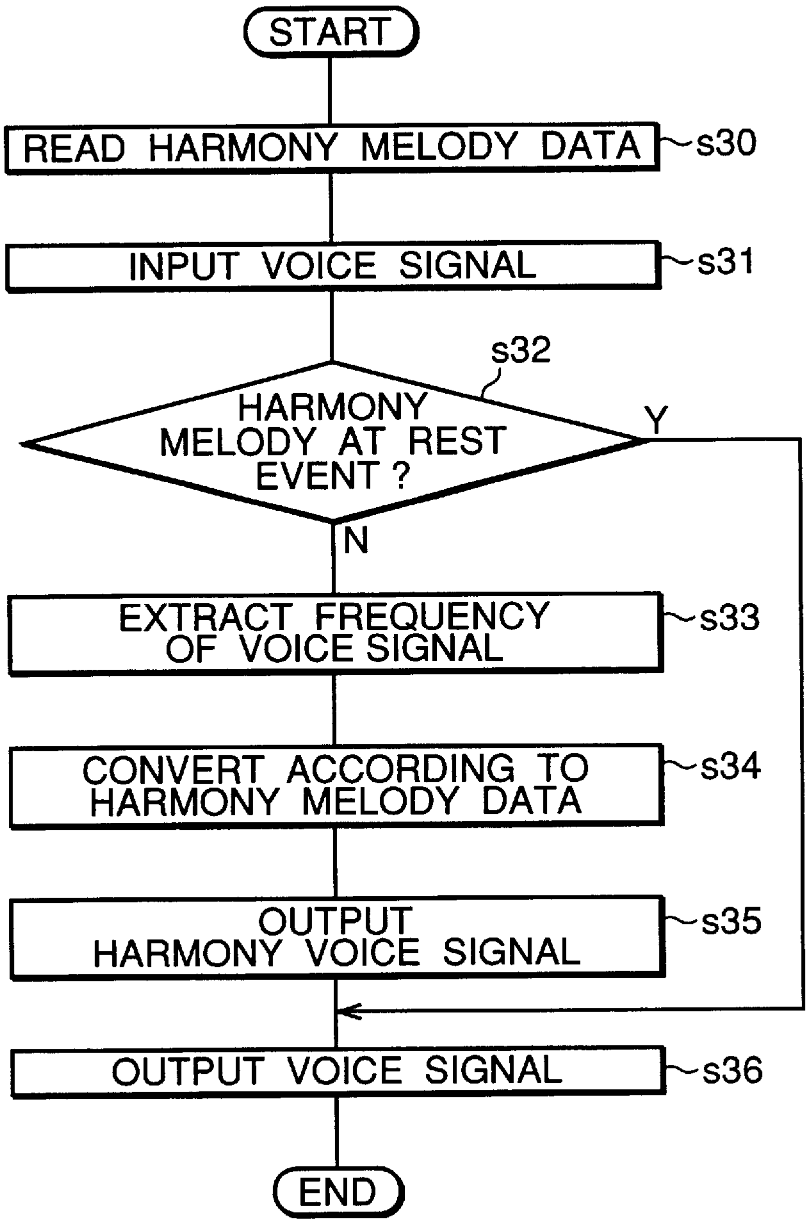
FIG. 9 is a flowchart describing operation of the DSP used in the karaoke apparatus of FIG. 4.

FIG. 9 is flowchart of a microprogram set to the DSP 61 when the above-mentioned karaoke apparatus executes the operation mode of FIG. 3. This operation is performed repeatedly in every sampling timing (every 1/44100 second for audio CD quality). First, the harmony melody data contained in the song data is read via the controller 50 and the controller 60 into the DSP 61 (s30). At the same time, a singing voice signal from the microphone 41 is inputted in the DSP 61 (s11). Next, the DSP 61 determines whether the harmony melody data read in step s30 indicates a rest event (s32). If the harmony melody data is found indicating a rest event, the DSP 61 simply outputs the singing voice signal inputted in step s31 to the mixer 63 to end the operation.

If the harmony melody data does not indicate a rest event, the DSP 61 extracts the frequency of the singing voice signal inputted in step s31 (s33). The DSP 61 converts the extracted frequency into the frequency of the harmony melody data read in step s30 (s34). Then, the DSP 61 outputs the converted singing voice signal to the mixer 63 as a harmony melody singing voice signal (s35). At the same time, the DSP 61 outputs the main melody singing voice signal inputted in step s31 to the mixer 63 (s36).

In the above-mentioned preferred embodiments, only the frequency of the inputted singing voice signal is corrected or converted to provide the singing voice signal of the harmony part or the back chorus part. It will be apparent that, not only the frequency but also the volume or the timbre such as male voice or female voice may be converted to provide a singing voice signal that sounds more like a harmony melody or a back chorus melody.

Figure 10:
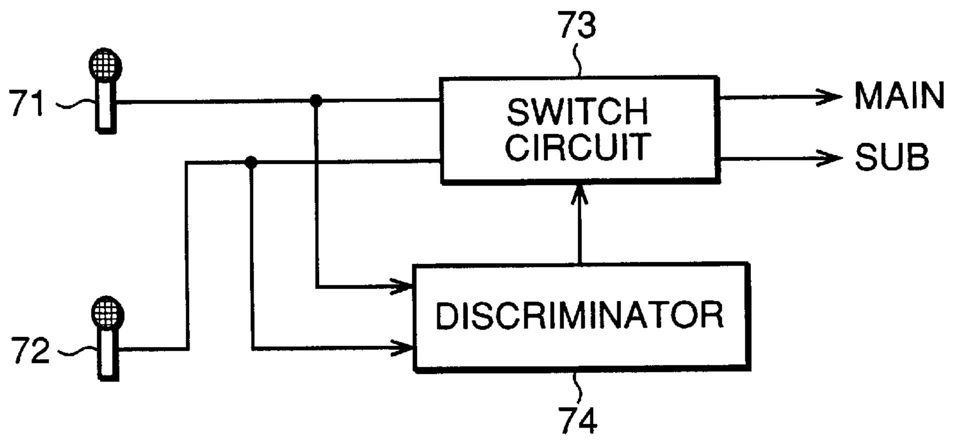
FIG. 10 is a diagram illustrating a switching unit used in the inventive karaoke apparatus for automatically switching between two microphones.

In the above-mentioned preferred embodiments, the main vocal microphone and the sub vocal microphone are discriminated from each other beforehand. Alternatively, the microphones may be interchangeably used by the main and sub singers. In such a case, it will be apparent that the frequencies of the singing voice signals inputted from two microphones may be analyzed to determine which of the inputted singing voice signals corresponds to the main vocal. The karaoke apparatus identifies the microphone from which the main vocal is inputted as the main vocal microphone (the first microphone), and connects the other microphone to the subsequent stage as the sub vocal microphone (the second microphone). This constitution is shown in FIG. 10. Two microphones 71 and 72 are connected to a switch circuit 73 and a discriminator 74. The switch circuit 73 interchangeably connects the microphones 71 and 72 to a main terminal and a sub terminal on the output side. The main terminal is connected to a device in which the main vocal is to be processed. The sub terminal is connected to another device in which the sub vocal is to be processed. The device in which the main vocal is to be inputted is the mixer 4 in the embodiment of FIG. 1, the mixer 16 in the embodiment of FIG. 2, or the mixer 26 and the harmony generator 27 in the embodiment of FIG. 3, or the DSP 61 in the embodiment of FIG. 4. The device in which the sub vocal is to be inputted is the adjuster 5 in the embodiment of FIG. 1, the adjuster 17 in the embodiment of FIG. 2, the adjuster 29 in the embodiment of FIG. 3, or the DSP 62 in the embodiment of FIG. 4. The switching operation of the switch circuit 73 is controlled by the discriminator 74. At beginning of karaoke performance, the switch circuit 73 connects both of the microphones 71 and 72 to the main terminal. Therefore, at beginning of karaoke performance, both the singing voice signals inputted from the microphones 71 and 72 are inputted as the main vocal. At the same time, the singing voice signals inputted from the microphones 71 and 72 are also inputted in the discriminator 74. The discriminator 74 analyzes the inputted singing voice signals until one phrase passes after beginning of the main melody. The discriminator 74 determines which of the inputted singing voice signals fits with the main vocal part, namely which of the signals matches the main melody better. Then, the discriminator 74 instructs the switch circuit 73 to maintain connection of the microphone from which the singing voice signal of the main vocal is inputted and to switch connection of the other microphone to the sub terminal. According to this instruction, the switch circuit 73 switches between the microphones. Thus, in the above-mentioned constitution, the singing voice signals are always inputted in their corresponding devices no matter which part is sung through any microphones, thereby implementing the above-mentioned correction capability and the part conversion capability.

Figure 11:
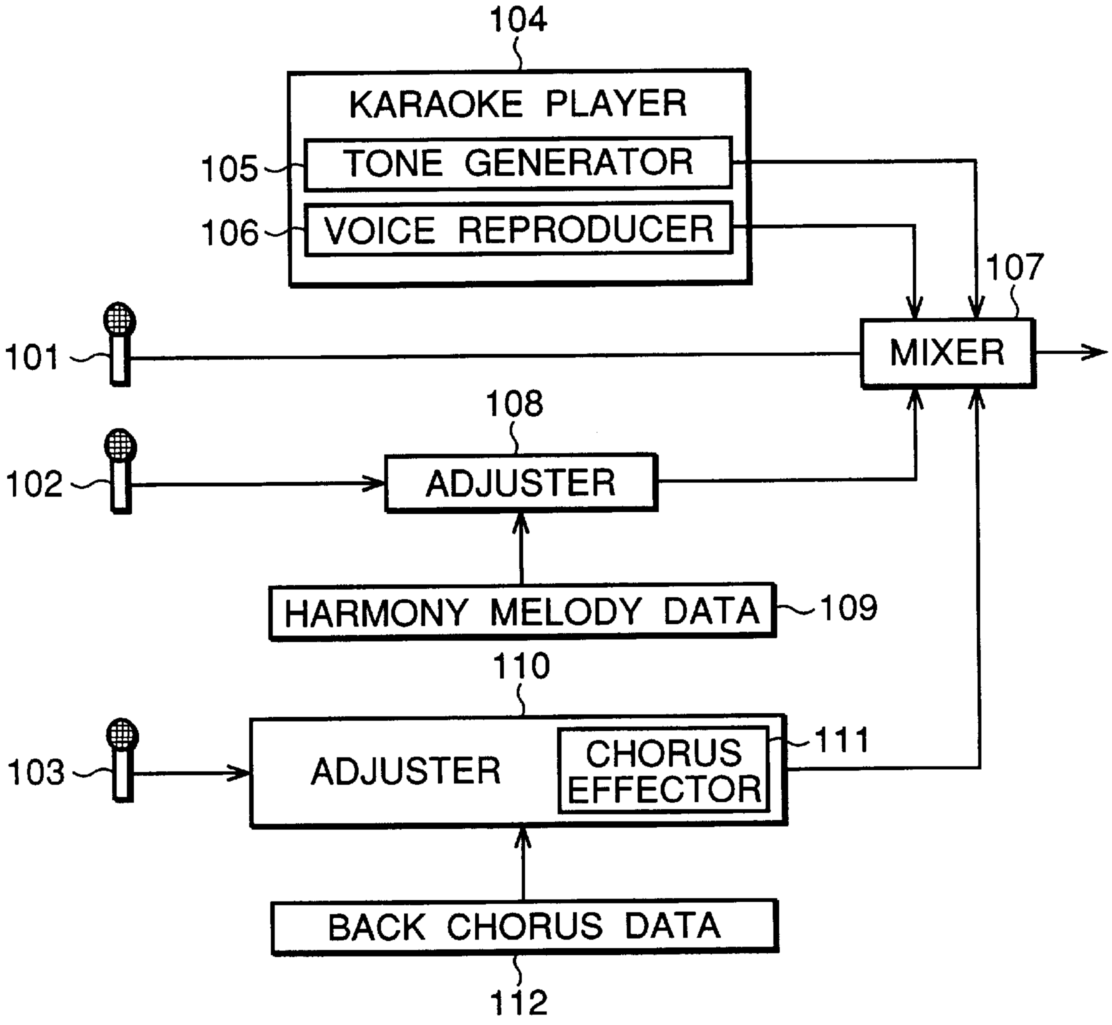
FIG. 11 is a schematic block diagram illustrating an embodiment of the inventive karaoke apparatus having three microphones.

In the above-mentioned preferred embodiments, there are two systems of microphone input. It will be apparent that three microphones may be connected to make three parts of main melody, harmony melody, and back chorus open to different singers. FIG. 11 shows a constitution of this case. A karaoke player 104 processes song data for karaoke performance to generate a karaoke accompaniment sound. This karaoke player 104 is composed of a tone generator 105 for generating an orchestral accompaniment sound and a voice reproducer 106 for reproducing a back chorus voice. The orchestral accompaniment sound generated by the tone generator 105 and the synthetic back chorus voice reproduced by the voice reproducer 106 are inputted in a mixer 107. A main vocal microphone 101 for inputting a main melody is directly connected to the mixer 107. A harmony vocal microphone 102 for inputting a harmony melody is connected to a harmony adjuster 108. The harmony adjuster 108 corrects the frequency of the harmony melody singing voice signal inputted from the harmony vocal microphone 102 to the frequency of the correct harmony melody data 109. The harmony melody singing voice signal corrected in frequency is inputted in the mixer 107. A back chorus microphone 103 for inputting a back chorus is connected to a back chorus adjuster 110. The back chorus adjuster 110 corrects the frequency of the singing voice signal inputted from the back chorus microphone 103 to the frequency of the correct back chorus data 112 and, at the same time, attaches chorus effect to this singing voice signal through an incorporated chorus effector 111. The singing voice signal corrected in pitch and attached with the chorus effect is then inputted in the mixer 107.

The mixer 107 mixes the orchestral accompaniment sound inputted from the karaoke player 104, the reproduced synthetic back chorus voice signal, the main melody singing voice signal inputted from the main vocal microphone 101, the harmony melody singing voice signal inputted from the harmony adjuster 108, and the back chorus singing voice signal inputted from the back chorus adjuster 110 altogether at a predetermined gain ratio, and outputs the resultant signal as a 2-channel stereo signal. This mixer 107 is connected to a succeeding stage of an audio amplifier and a speaker by which this stereo signal is amplified and sounded.

In the above-mentioned preferred embodiment, if a harmony melody is sung by mistake at a timing where there is no note events of the harmony melody, the harmony adjuster 108 mutes this singing voice signal, thereby preventing interference with the main melody. If a back chorus is sung by mistake at a timing where no back chorus is required, the back chorus adjuster 110 mutes this singing voice signal, thereby preventing interference with the main melody. Further, if a back chorus is sung correctly, the mixer 107 mutes the reproduced synthetic back chorus voice signal inputted from the voice reproducer 106 of the karaoke player 104, thereby making conspicuous the live back chorus singing voice being sung correctly.

Thus, the main melody, the harmony melody, and the back chorus of a karaoke music piece are sung jointly through three systems of microphones respectively, and the harmony melody and the back chorus which are more difficult to sing and hence more erroneously sung than the main melody are corrected, thereby allowing amateur singers to sing the harmony melody and the back chorus with ease for enjoyment of joint karaoke play with many singers. In this constitution, a plurality of singing voice signals inputted from one or two microphones may be separated inside the karaoke apparatus. The separation of singing voice signals is described in Japanese Patent Application Nos. Hei 7-303046 and Hei 7-303047, for example.

As described and according to the invention, a harmony melody is not derived from the singing voice signal of a main melody, but is made open to a sub singer other than a main singer of the main melody, thereby allowing a plurality of singers to enjoy karaoke play. In this case, at least the pitch of the singing voice signal of the harmony melody more difficult to sing than the main melody is corrected. Consequently, singers can join karaoke play more easily, thereby preventing interference with the main melody that may otherwise be caused when the pitch of the harmony melody gets out of tune.

According to the invention, when the harmony melody is at a rest event, the singing voice signal inputted from a sub vocal microphone is muted. This prevents interference with the main melody if the beginning or ending of the singing voice gets out of timing in the harmony melody which is more difficult to sing than the main melody.

According to the invention, if no singing voice signal is inputted from the sub microphone although there is a note event of the harmony melody to sing, the singing voice signal of the harmony melody is derived from the singing voice signal of the main melody inputted from the main vocal microphone. Consequently, even if the beginning or ending of singing voice gets out of timing in singing the harmony melody which is more difficult to sing than the main melody, the harmony melody is supplemented.

According to the invention, a back chorus part is made open to singers, thereby allowing a plurality of singers to enjoy karaoke back chorus play along with the main melody. In this case, at least the pitch of the singing voice signal of the back chorus which is more difficult to sing than the main melody is corrected. Consequently, singers can join the back chorus more easily, thereby preventing interference with the main melody that may otherwise be caused when the pitch of the back chorus gets out of tune.

According to the invention, when the singing voice signal for the back chorus is inputted from the sub microphone, a synthetic back chorus tone outputted as a part of the karaoke accompaniment sound is muted. Consequently, the singing voice of the sub singer can be made conspicuous and the volume of the back chorus can be prevented from getting too loud.

According to the invention, when the back chorus is at a rest event, the singing voice signal inputted from the sub microphone is muted. This prevents interference with the main melody if the beginning or ending of singing voice gets out of timing in singing the back chorus which is more difficult to sing than the main melody.

While the preferred embodiments of the present invention have been described using specific terms, such description is for illustrative purposes only, and it is to be understood that changes and variations may be made without departing from the spirit or scope of the appended claims.

What is claimed is:

1. A karaoke apparatus for playing a karaoke song according to song data jointly with a first vocal part and a second vocal part, comprising:

a generator device that processes the song data to produce an orchestral accompaniment sound during the course of play of the karaoke song;

a first input device that collects a first singing voice which is physically sung along the orchestral accompaniment sound to fit with the first vocal part;

a second input device that collects a second singing voice which is physically sung along the orchestral accompaniment sound to support the first singing voice;

an adjuster device that adjusts at least a pitch of the second singing voice collected by the second input device according to reference data contained in the song data so as to fit the second singing voice with the second vocal part; and a mixer device that mixes the first singing voice collected by the first input device and the second singing voice fed from the adjuster device together with the orchestral accompaniment sound to thereby effect play of the karaoke song.

2. A karaoke apparatus according to claim 1, wherein the first input device collects the first singing voice which is sung along a main melody allotted to the first vocal part, while the second input device collects the second singing voice which is sung along a harmony melody allotted to the second vocal part and made consonant with the main melody, and wherein the adjuster device adjusts the second singing voice according to reference data representative of the harmony melody.

3. A karaoke apparatus according to claim 2, wherein the adjuster device includes a muting section that mutes the second singing voice when the same is incorrectly sung at a rest event of the harmony melody.

4. A karaoke apparatus according to claim 2, wherein the adjuster device further comprises a harmony section that operates when the second singing voice is incorrectly not sung to miss note events contained in the harmony melody for modifying the first singing voice according to the reference data to fit with the second vocal part in place of the missing second singing voice.

5. A karaoke apparatus according to claim 1, wherein the first input device collects the first singing voice which is sung along a solo melody allotted to the first vocal part, while the second input device collects the second singing voice which is sung along a chorus melody allotted to the second vocal part and made to back the solo melody, and wherein the adjuster device adjusts the second singing voice according to reference data representative of the chorus melody.

6. A karaoke apparatus according to claim 5, wherein the adjuster device includes a muting section that mutes the second singing voice when the same is incorrectly sung at a rest event of the chorus melody.

7. A karaoke apparatus according to claim 5, wherein the generator device includes a chorus section that generates a synthetic singing voice, and wherein the mixer device operates when the second singing voice is not sung for selecting the synthetic singing voice to fill the second vocal part in place of the second singing voice, and otherwise operates when the second singing voice is sung for muting the synthetic singing voice.

8. A karaoke apparatus according to claim 5, further comprising a harmony device that creates a harmony singing voice which is derived from the first singing voice and which is made consonant with the first singing voice.

9. A karaoke method of playing a karaoke song according to song data jointly with a first vocal part and a second vocal part, comprising the steps of:

processing the song data to produce an orchestral accompaniment sound during the course of play of the karaoke song;

collecting a first singing voice which is physically sung along the orchestral accompaniment sound to fit with the first vocal part;

separately collecting a second singing voice which is physically sung along the orchestral accompaniment sound in parallel to the first singing voice to support the first singing voice;

adjusting at least a pitch of the collected second singing voice according to reference data contained in the song data so as to fit the second singing voice with the second vocal part; and mixing the collected first singing voice and the adjusted second singing voice together with the generated orchestral accompaniment sound to thereby effect play of the karaoke song.

10. A karaoke method according to claim 9, wherein the step of collecting comprises collecting the first singing voice which is sung along a main melody allotted to the first vocal part, while the step of separately collecting comprises collecting the second singing voice which is sung along a harmony melody allotted to the second vocal part and made consonant with the main melody, and wherein the step of adjusting comprises adjusting the collected second singing voice according to reference data representative of the harmony melody.

11. A karaoke method according to claim 10, wherein the step of adjusting further comprises muting the collected second singing voice when the same is incorrectly sung at a rest event of the harmony melody.

12. A karaoke method according to claim 10, further comprising the step of modifying the collected first singing voice according to the reference data to fit with the second vocal part in place of the second singing voice when the second singing voice is incorrectly not sung to miss note events contained in the harmony melody.

13. A karaoke method according to claim 9, wherein the step of collecting comprises collecting the first singing voice which is sung along a solo melody allotted to the first vocal part, while the step of separately collecting comprises collecting the second singing voice which is sung along a chorus melody allotted to the second vocal part and made to back the solo melody, and wherein the step of adjusting comprises adjusting the collected second singing voice according to reference data representative of the chorus melody.

14. A karaoke method according to claim 13, wherein the step of adjusting further comprises muting the collected second singing voice when the same is incorrectly sung at a rest event of the chorus melody.

15. A karaoke method according to claim 13, wherein the step of processing includes generating a synthetic singing voice to fill the second vocal part in place of the second singing voice when the second singing voice is not sung, and otherwise muting the synthetic singing voice when the second singing voice is sung.

16. A karaoke method according to claim 13, further comprising the step of creating a harmony singing voice which is derived from the first singing voice and which is made consonant with the first singing voice.

17. A machine readable medium for use in a karaoke apparatus having a CPU and playing a karaoke song according to song data jointly with a first vocal part and a second vocal part, the medium containing program instructions executable by the CPU for causing the karaoke apparatus to perform the steps of:

processing the song data to produce an orchestral accompaniment sound during the course of play of the karaoke song;

collecting a first singing voice which is physically sung along the orchestral accompaniment sound to fit with the first vocal part;

separately collecting a second singing voice which is physically sung along the orchestral accompaniment sound in parallel to the first singing voice to support the first singing voice;

adjusting at least a pitch of the collected second singing voice according to reference data contained in the song data so as to fit the second singing voice with the second vocal part; and mixing the collected first singing voice and the adjusted second singing voice together with the generated orchestral accompaniment sound to thereby effect play of the karaoke song.

18. A machine readable medium according to claim 17, wherein the step of collecting comprises collecting the first singing voice which is sung along a main melody allotted to the first vocal part, while the step of separately collecting comprises collecting the second singing voice which is sung along a harmony melody allotted to the second vocal part and made consonant with the main melody, and wherein the step of adjusting comprises adjusting the collected second singing voice according to reference data representative of the harmony melody.

19. A machine readable medium according to claim 18, wherein the step of adjusting further comprises muting the collected second singing voice when the same is incorrectly sung at a rest event of the harmony melody.

20. A machine readable medium according to claim 18, wherein the steps further comprise modifying the collected first singing voice according to the reference data to fit with the second vocal part in place of the second singing voice when the second singing voice is incorrectly not sung to miss note events contained in the harmony melody.

21. A machine readable medium according to claim 17, wherein the step of collecting comprises collecting the first singing voice which is sung along a solo melody allotted to the first vocal part, while the step of separately collecting comprises collecting the second singing voice which is sung along a chorus melody allotted to the second vocal part and made to back the solo melody, and wherein the step of adjusting comprises adjusting the collected second singing voice according to reference data representative of the chorus melody.

22. A machine readable medium according to claim 21, wherein the step of adjusting further comprises muting the collected second singing voice when the same is incorrectly sung at a rest event of the chorus melody.

23. A machine readable medium according to claim 21, wherein the step of processing includes generating a synthetic singing voice to fill the second vocal part in place of the second singing voice when the second singing voice is not sung, and otherwise muting the synthetic singing voice when the second singing voice is sung.

24. A machine readable medium according to claim 21, wherein the steps further comprise creating a harmony singing voice which is derived from the first singing voice and which is made consonant with the first singing voice.

* * * * *